United States Patent Office.

T. F. McCAFFERTY, OF FOREST, OHIO.

Letters Patent No. 68,221, dated August 27, 1867.

IMPROVED COMPOUND TO BE USED IN BEE-HIVES.

The Schedule referred to in these Letters Patent and making part of the same.

TO ALL WHOM IT MAY CONCERN:

Be it known that I, T. F. McCafferty, of Forest, in the county of Hardin, and State of Ohio, have invented a new and improved "Compound;" and I do hereby declare that the following is a full, clear, and exact description thereof, which will enable others skilled in the art to make and use the same.

The present invention relates to a compound to be used in bee-hives to free them from moths, and so retain them without the least danger of injury to the bees.

This compound is made of one grain of oil of sassafras, one-half ($\frac{1}{2}$) grain benzoic acid, and one (1) ounce whiskey, with the whole thoroughly mixed and incorporated together.

I claim as new, and desire to secure by Letters Patent—

The compound made of the ingredients, substantially as and for the purpose specified.

T. F. McCAFFERTY.

Witnesses:
A. J. FLAHARTY,
J. E. LOWRY.